United States Patent
Esecson et al.

(10) Patent No.: US 11,334,906 B2
(45) Date of Patent: May 17, 2022

(54) DEVICE AGNOSTIC SINGLE VERIFICATION DIGITAL PAYMENT PROCESSING SYSTEM FOR ACCEPTING PAYMENT FROM A USER DEVICE AT A BRICK AND MORTAR POINT OF SALE TERMINAL

(71) Applicant: KleeneCar, Inc., New York, NY (US)

(72) Inventors: Austin Esecson, San Francisco, CA (US); Samuel Jackson Logan, New York, NY (US)

(73) Assignee: KLEENECAR, INC., New York, NY (US)

(*) Notice: Subject to any disclaimer, the term of this patent is extended or adjusted under 35 U.S.C. 154(b) by 56 days.

(21) Appl. No.: 16/792,234

(22) Filed: Feb. 15, 2020

(65) Prior Publication Data
US 2020/0265458 A1  Aug. 20, 2020

Related U.S. Application Data

(60) Provisional application No. 62/806,730, filed on Feb. 15, 2019.

(51) Int. Cl.
*G06Q 30/02* (2012.01)
*G06Q 30/06* (2012.01)
*G06Q 20/20* (2012.01)
*G06Q 20/32* (2012.01)
*G06Q 20/36* (2012.01)
(Continued)

(52) U.S. Cl.
CPC ....... *G06Q 30/0238* (2013.01); *G06F 16/903* (2019.01); *G06K 7/1413* (2013.01); *G06K 7/1417* (2013.01); *G06Q 20/127* (2013.01); *G06Q 20/202* (2013.01); *G06Q 20/208* (2013.01); *G06Q 20/209* (2013.01); *G06Q 20/3224* (2013.01); *G06Q 20/34* (2013.01); *G06Q 20/36* (2013.01);
(Continued)

(58) Field of Classification Search
CPC .......... G06Q 30/0238; G06Q 30/0631; G06Q 20/209; G06Q 30/0222; G06Q 30/0225; G06Q 20/3224; G06Q 20/208; G06Q 20/36; G06Q 20/202; G06Q 20/127; G06Q 20/34; G06Q 20/326; G06Q 20/027; G06Q 20/387; G06Q 20/40145; G06K 7/1413; G06K 7/1417; G06F 16/903
See application file for complete search history.

(56) References Cited

U.S. PATENT DOCUMENTS 8,370,180 B2 * 2/2013 Scott .................. H04L 63/0807
 705/5
11,074,570 B2 * 7/2021 Davis .................... G06Q 20/40
(Continued)

*Primary Examiner* — Sonji N Johnson
(74) *Attorney, Agent, or Firm* — Shah IP Law, PLLC

(57) ABSTRACT

The present disclosure is for a system and a method for disaggregating point-of-sale terminals in coupon or token based transactions wherein buyers may initiate a purchase transaction via a computing device and/or their mobile-wallets and sellers may complete the transaction on their point-of-sale terminals, which may not have digital payment processing capabilities. Unlike traditional coupon or token redemption systems, which require communication from a point-of-sale terminal and a user device (and the related infrastructure required to integrate the two systems), systems and methods of the present enable verification using a single device.

18 Claims, 10 Drawing Sheets

(51) Int. Cl.
*G06Q 20/12* (2012.01)
*G06K 7/14* (2006.01)
*G06F 16/903* (2019.01)
*G06Q 20/34* (2012.01)

(52) U.S. Cl.
CPC ..... *G06Q 30/0222* (2013.01); *G06Q 30/0225* (2013.01); *G06Q 30/0631* (2013.01)

(56) References Cited

U.S. PATENT DOCUMENTS

| | | | |
|---|---|---|---|
| 2011/0313918 A1* | 12/2011 | Lawson | G06K 9/18 705/40 |
| 2015/0100405 A1* | 4/2015 | Lee | G06Q 30/0255 705/14.39 |
| 2018/0046982 A1* | 2/2018 | Li | G06Q 30/0261 |
| 2018/0108031 A1* | 4/2018 | Jones | G06Q 20/204 |

* cited by examiner

DEVICE AGNOSTIC SINGLE VERIFICATION DIGITAL PAYMENT PROCESSING SYSTEM FOR ACCEPTING PAYMENT FROM A USER DEVICE AT A BRICK AND MORTAR POINT OF SALE TERMINAL

CROSS-REFERENCE TO RELATED APPLICATIONS

This application claims priority to U.S. Provisional Patent Application Ser. No. 62/806,730, filed Feb. 15, 2019 entitled "POS Device Agnostic Single Verification Digital Payment Processing System for Accepting Payment from Mobile Users." The entire content of that application is incorporated herein by this reference.

BACKGROUND

Field of the Art

This disclosure relates to systems and methods for accepting payments on traditional point of sale (POS) systems without complicated back end integration support.

Discussion of the State of the Art

Currently, traditional point-of-sale-systems (POS systems), such as the ones used at most brick and mortar retail stores, are configured to accept payment transactions via one or more payment methodologies. For example, traditional point of sale systems may accept cash payments, credit card payments, etc. Some may even accept payment from mobile wallets and/or mobile payment applications such as APPLE PAY, SAMSUNG PAY, etc. However, traditional POS systems rarely accept more than a few types of payment methodologies. Thus, if a merchant wants to expand his or her payment offerings beyond the offerings provided or enabled by his or her existing POS terminal, the merchant typically must invest in expensive new hardware (i.e. new or upgraded POS terminals and potentially new back-end infrastructure to support the terminals) and risk potential disruption with regards to the existing payment methodologies that may be offered. Indeed, as the number and diversity of payment methodologies expand, it is virtually impossible for brick and mortar retail merchants to future-proof their POS system to ensure compatibility with new and/or additional payment methodologies that customers may want and/or demand without purchasing expensive new hardware and/or software.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope or spirit of the claimed subject matter.

Systems and methods in accordance with the principles of the present invention overcome the limitations outlined above by enabling a user or a customer to pay with a desired payment processing system using the user's computing device, and permits a brick-and-mortar retailer to accept payment via the customer's desired payment processing system even if the merchant does not have a POS system that can process the customer's desired payment processing system. More specifically, systems and methods in accordance with the principles of the present invention permit merchant to use traditional point of sale systems to accept payments by connecting their POS system to payment integration system that enables customers to pay via their desired payment methodology (even if the payment methodology is not supported by the merchant's POS system). In one embodiment of the invention, the payment integration system integrates with the merchant's POS system and converts the customer's purchase into coupons and/or tokens that may be redeem for value at a merchant's brick-and-mortar retail location, wherein the redemption process is performed by the customer's POS system. The inventive system enables customer to initiate a purchase transaction via a computing device and/or their mobile-wallets and enables merchants to complete the transaction on their point-of-sale terminals, which may not otherwise have the hardware and/or software capability to process the payment methodology that a customer desires to transact in.

In one exemplary embodiment, the present invention enables a merchant to accept APPLE PAY as a payment methodology even if the merchant does not have the hardware to process APPLE PAY payments at a brick-and-mortar retail location. In one embodiment, the present invention enables customers to complete a purchase transaction on his or her computing device. Once the purchase transaction is consummated, a coupon and/or a token may be generated and delivered to the user's computing device and/or the back-end system that is associated with a merchant's POS system. A user may redeem his or her coupon by presenting the coupon to the merchant at his or her brick-and-mortar retail location. The merchant may provide the goods and/or services associated with the user's purchase once the coupon is accepted and/or verified by the merchant's POS system.

In this manner, the present invention essentially disaggregates the payment processing and the verification functions that are typically performed by POS terminals. For example, the payment processing function such as receiving user (hereinafter also referred to as a customer) credentials associated details are essentially performed by a payment processing system and the customer's computing device. However, the task of generating coupon codes and associating those codes with merchants and/or purchased good and/or services—and verifying coupon data when the coupon is redeemed—is performed by a payment integration system and/or the POS system. As such, the present invention allows a user or a customer to purchase goods/services/memberships using a variety of different payment methodologies (which may or may not be supported by the POS system at a merchant's brick-and-mortar location), and permits the merchant to dispense purchased goods/services/products associated with memberships by using their legacy POS terminal—without having to perform a second transaction and/or verification step, and without necessarily having to upgrade POS hardware and/or associated software.

In addition, the present invention represents an improvement over traditional payment and verification systems because it requires fewer verification calls to fewer devices/systems, and therefore represents a more expedient and robust infrastructure for processing digital wallet and mobile payment application transactions. For example, in a traditional POS system that accepts mobile wallet and/or mobile payment applications transactions (such as, for example, APPLE PAY), the user's computing device is used to verify the user's identity. Similarly, the POS terminal itself is also used to verify the transaction. The present invention, however, provides a system in which coupon purchase is verified before/after/at the same time as the coupon is generated for presentation to the vendor via a display on the user's device requires a single verification. This novel approach of authenticating a specific coupon purchase transaction inherently provides a mechanism by which the vendor can rely upon the authenticity of the coupon being presented without having to upgrade the POS terminal to incorporate two-device authentication capability. This feature of the inventive system and method is particularly valuable when a POS terminal is not connected to a network or only has intermittent network connection, such as, in poorly network connected areas. For example, a POS system may only need to connect to a payment integration system intermittently to obtain generated coupon codes, which may thereafter be redeemed even when the POS system is not network connected.

BRIEF DESCRIPTION OF THE DRAWING FIGURES

The accompanying drawings illustrate several embodiments and, together with the description, serve to explain the principles of the present invention according to the embodiments. It will be appreciated by one skilled in the art that the particular arrangements illustrated in the drawings are merely exemplary and are not to be considered as limiting of the scope or spirit of the present invention or the claims herein in any way.

Figure 1:
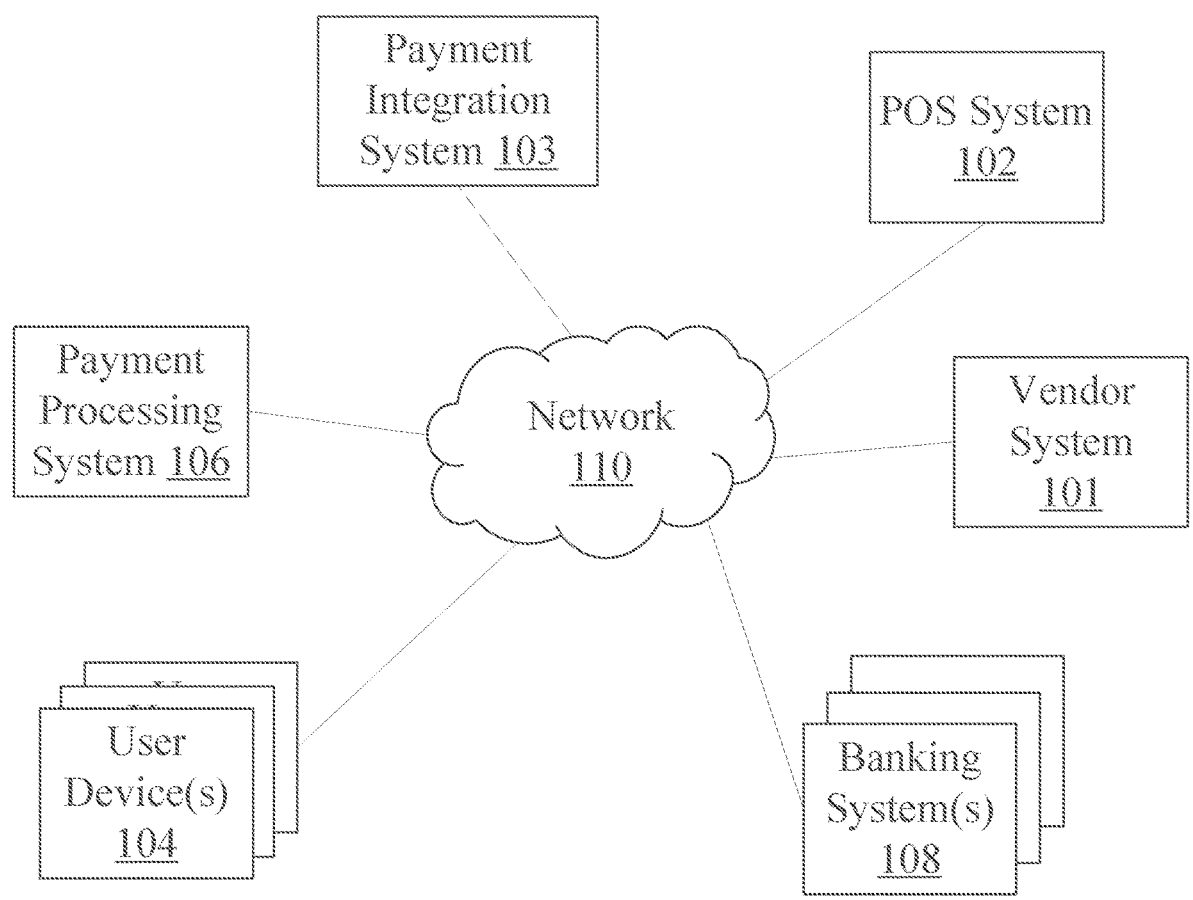
FIG. 1 is a block diagram of an exemplary operating environment, in accordance with the principles of the present invention.

As noted above, in the above reference figures, the present invention is illustrated by way of example, not limitation, and modifications may be made to the elements illustrated therein, as would be apparent to a person of ordinary skill in the art, without departing from the scope or spirit of the invention.

DETAILED DESCRIPTION

The inventor has conceived, and reduced to practice, an exemplary system and method described herein for enabling a traditional point of sale system with a coupon infrastructure to accept payments from a customer's mobile computing device in accordance with the principles of the present invention.

Initial Considerations

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope or spirit of the present invention. Particular features of one or more of the embodiments described herein may be described with reference to one or more particular embodiments or figures that form a part of the present invention, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the present invention in any way.

Devices and parts that are connected to or in communication with each other need not be in continuous connection or communication with each other, unless expressly specified otherwise. In addition, devices and parts that are connected to or in communication with each other may communicate directly or indirectly through one or more connection or communication means or intermediaries, logical or physical.

A description of an aspect with several components in connection or communication with each other does not imply that all such components are required. To the contrary, a variety of optional components may be described to illustrate a wide variety of possible embodiments and in order to more fully illustrate one or more embodiments. Similarly, although process steps, method steps or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope or spirit of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates a block diagram of an exemplary operating environment in accordance with the principles of the present invention. The operating environment may be comprised of a vendor system 101, a point-of-sale ("POS") system 102, a payment integration system 103, a payment processing system 106, a banking system 108, one or more user devices 104, and a network 110. The various systems communicate with each other to enable a user to make a purchase transaction on his or her preferred device using a variety of different payment systems (such as, for example and without limitation, mobile wallets, credit cards, points, etc.), and enable a vendor to perform payment verification system on a device that may not be integrated with a payment processing system 106.

The POS system 102, as used herein, refers to point-of-sale systems, which may include a point-of-sale terminal and relevant backend infrastructure. In one embodiment, a POS system 102 may be comprised of a cash register that may process credit card payments. Other POS systems 102 that may accept other payment methodologies, such as APPLE PAY, GOOGLE PAY, SAMSUNG PAY, ALIPAY, etc. may be included without departing from the scope of the invention. In one embodiment, the POS system 102 has the capability to scan and/or otherwise process a coupon being presented and correlate the scanned coupon with a specific coupon previously generated and/or stored on a server (such as, for example, an on-premises server that is connected to the POS terminal). Thus, each coupon that is presented at a POS terminal can be processed at the point of sale terminal. In one embodiment, the POS system 102 could be any computing device, such as those described herein, that is associated with the vendor's existing POS device and that is configured to be capable of "reading" and processing a coupon presented to the vendor on a user's device 104. The coupon may be in the form of an image, text, numbers, or a combination thereof. In one embodiment, as described in greater detail below in reference to FIGS. 2A-2C, the POS system 102 may be capable of generating coupons and/or storing the coupons that may be redeemed for goods and/or services that may be offered by a vendor or a merchant at a brick-and-mortar retail location.

The vendor system 101 refers to a system that connects the POS system 102 with the payment integration system 103. The vendor system may refer to a server or a database that enables the vendor to complete traditional cash and/or credit-card based transactions as would be known in the prior art. For example, the vendor system 101 may be an on-premises server or system that handles credit card payments.

Figure 2A:
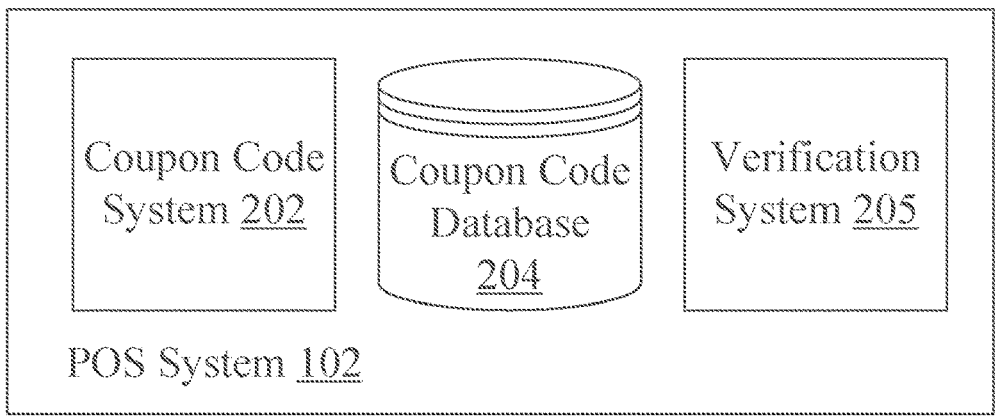
FIG. 2A is a block diagram illustrating an exemplary point-of-sale system, in accordance with the principles of the present invention.
Figure 2B:
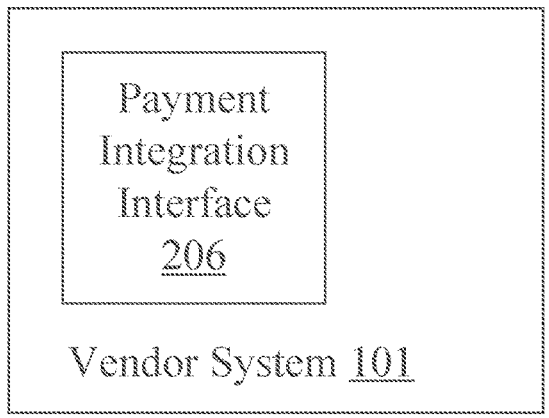
FIG. 2B is a block diagram illustrating an exemplary vendor system, in accordance with the principles of the present invention.
Figure 2C:
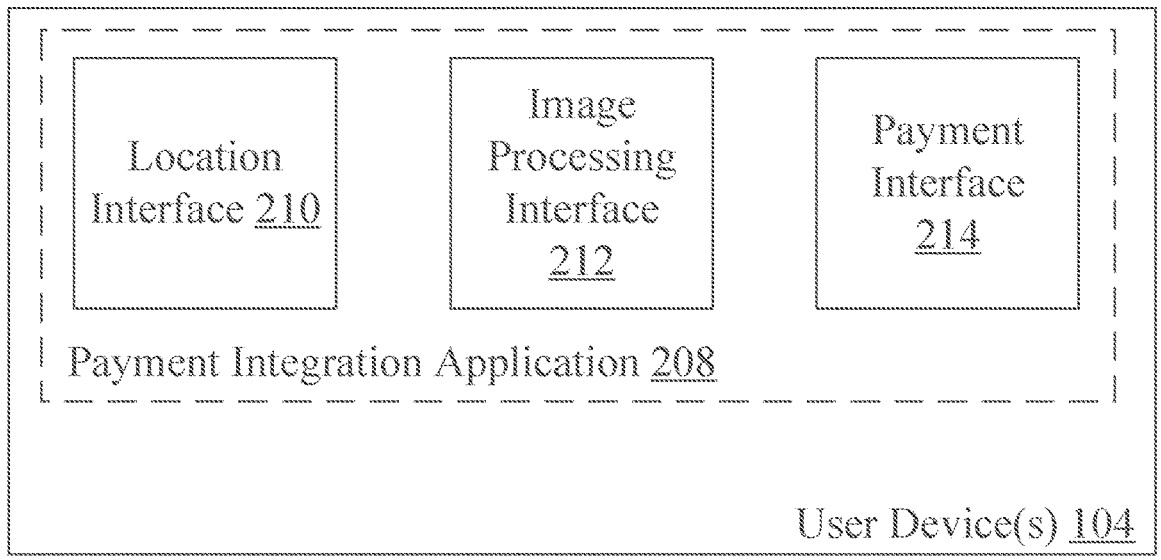
FIG. 2C is a block diagram illustrating an exemplary user device, in accordance with the principles of the present invention.

As described in greater detail below, in reference to FIGS. 2A-2C, the vendor system 101 may be comprised of a payment integration interface. The payment integration interface may be, for example, a module and/or a code executing on a POS system 102 and/or the vendor system 101 that enables the vendor system 101 to communicate with the payment integration system 103. In one embodiment of the invention, the vendor system 101 generates coupon codes that may be redeemed at the premises where the vendor system 101 is physically located. In other instances, the vender system 101 provides and/or receives coupon data that may have been issued by a vendor or will be issued by a vendor and provides that data to the payment integration system 103. For example, the vendor might use the vendor system 101 and/or the POS system 102 to initiate coupon generation by entering coupon data into coupon code database 204, and this coupon data is then transmitted by the vendor system 101 and/or the POS system 102 to be stored also in the coupon data storage unit in the payment integration system 103. The coupon data provided to the payment integration system 103 may be associated with a customer request or a purchase and passed on to the customer if certain conditions, which are described in greater detail below in reference to FIGS. 2A-2C, are satisfied.

The payment integration system 103 connects the POS system 102 and/or the vendor system 103 to the payment processing system 106 in a way that a customer can make purchases using a payment methodology that he or she desires (such as, for example, APPLE PAY, ALI PAY, etc.) and permitting a vendor or a merchant at a brick-and-mortar location to accept payment even if his or her POS hardware/software does not support the customer's desired payment methodology. In one embodiment, the payment integration system 103 connects with the vendor system 101 to issue coupons to a user in exchange for receiving payment from the user, and interfaces with the payment processing system 106 to ensure that a payment transaction is complete and verified. By doing this, as described herein, the payment integration system 103 enables traditional POS system to redeem coupons that have been paid for in a payment transaction that is not supported by the POS system in the merchant's brick-and-mortar location.

Generally, the payment integration system 103 connects a user to a payment processing system 106 to enable the user to make a payment transaction. If the user desires to use funds that are associated with the payment transaction at a particular vendor, then the payment integration system 103 issues a digital version of a coupon that is provided by the vendor system 101. In an embodiment of the present invention, the payment integration system 103 enables a user to identify vendors based on the user's need and/or geographic location.

The payment processing system 106 and the banking system 108 enable a user to execute a purchase transaction via his or her preferred payment method. For example, and without limitation, the payment processing system 106 may serve as a gateway or an interface for a user to provide payment credentials. The payment processing system 106 thereafter settles the transaction with the appropriate banking system 108. The specific method and systems for executing a transaction through a payment processing system 106 and the banking system 108 would be readily apparent to a person of ordinary skill in the art. For example, payment processors, such as STRIPE and PAYPAL are well known and their integration into other websites or platforms is well known. These payment processing gateways and/or their integration is not considered to be a subject of this invention, however, their function and use in the inventive system herein is considered novel and non-obvious.

The network 110 connects the various systems and computing devices described or referenced herein. In particular embodiments of the present invention, network 110 can be an intranet, an extranet, a virtual private network (VPN), a local area network (LAN), a wireless LAN (WLAN), a wide area network (WAN), a metropolitan area network (MAN), a portion of the Internet, or another network or a combination of two or more such networks 110. The present invention contemplates any suitable network 110.

One or more links couple one or more systems, engines or devices to the network 110. In particular embodiments of the present invention, one or more links may each include one or more wired, wireless, or optical links. In particular embodiments of the present invention, one or more links may each include an intranet, an extranet, a VPN, a LAN, a WLAN, a WAN, a MAN, a portion of the Internet, or another link or a combination of two or more such links. The present invention contemplates any suitable links coupling one or more systems, engines or devices to the network 110.

In particular embodiments of the present invention, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments of the present invention, each system, engine or module may include hardware, software, or embedded logic components or a combination of two or more such components for carrying out the appropriate functionalities implemented or supported by their respective servers.

For example and without limitation, a web server is generally capable of hosting websites containing web pages or particular elements of web pages. More specifically, a web server may host Hyper Text Markup Language (HTML) files or other file types, or may dynamically create or constitute files upon a request, and communicate them to client devices or other devices in response to a Hyper Text Transfer Protocol (HTTP) or other requests from client devices or other devices. A mail server is generally capable of providing electronic mail services to various client devices or other devices. A database server is generally capable of providing an interface for managing data stored in one or more data stores.

In particular embodiments of the present invention, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

In particular embodiments of the present invention, each user device 104 may be an electronic device including hardware, software, or embedded logic components or a combination of two or more such components and capable of carrying out the appropriate functions implemented or supported by the user device 104. For example, and without limitation, a user device 104 may be a desktop computer system, a notebook computer system, a netbook computer system, a handheld electronic device, or a mobile telephone. The present invention contemplates any user device 104. A user device 104 may enable a network user at the user device 104 to access network 110, including, for example, in the non-limiting example of a vendor providing car wash service, one or more smart devices incorporated in a vehicle that could serve as a user device 104 as having capability of connecting to a network 110. A user device 104 may enable its user to communicate with other users at other user devices 104.

A user device 104 may have a web browser, such as MICROSOFT INTERNET EXPLORER available from Microsoft Corporation, One Microsoft Way, Redmond, Wash. 98052, GOOGLE CHROME available from Google Inc., 1600 Amphitheatre Parkway, Mountain View, Calif. 94043 or MOZILLA FIREFOX administered by the Mozilla Foundation, 331 E. Evelyn Ave., Mountain View, Calif. 94041, and may have one or more add-ons, plug-ins, or other extensions, such as a TOOLBAR for example the YAHOO TOOLBAR available from Verizon, 1095 Avenue of the Americas, New York, N.Y. 10036.

A user device 104 may enable a user to enter a Uniform Resource Locator (URL) or other address directing the web browser to a server, and the web browser may generate a HTTP request and communicate the HTTP request to server. The server may accept the HTTP request and communicate to the user device 104 one or more HTML files responsive to the HTTP request. The user device 104 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT available from Microsoft Corporation, One Microsoft Way, Redmond, Wash. 98052, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 104 may also include an application that is loaded onto the user device 104. The application 104 obtains data from the network 110 and displays it to the user within the application interface.

Exemplary user devices are illustrated in some of the subsequent Figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example and without limitation, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a computer device in a vehicle, a server, or a combination of two or more of these.

Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Detailed Description of Exemplary Embodiments

FIGS. 2A, 2B, AND 2C are block diagrams that illustrate various exemplary sub-components and sub-systems in accordance with the principles of the present invention associated with one or more systems that are illustrated in FIG. 1. Specifically, FIG. 2A illustrates components of the exemplary POS system 102 of FIG. 1, which may be further comprised of coupon code system 202, the coupon code database 204, and the verification system 205; FIG. 2B illustrates a component of the exemplary vendor system 101 of FIG. 1, which may be further comprised of a payment integration interface 206; FIG. 2C illustrates an exemplary user device 104 of FIG. 1, which may be further comprised of a location interface 210, image processing interface 212, and a payment interface 214.

Referring now to FIGS. 2A and 2B, which show additional details of the POS system 102 and the vendor system 101. Although the two systems are illustrated as being separate, the two systems may be integrated into a singular system that performs some or all of the tasks identified herein. As illustrated in FIG. 2A, the POS system 102, in accordance with an embodiment of the invention, may be comprised of a coupon code system 202 and a coupon database 204. The coupon code system 202 generally refers to a system that generates and/or receives coupon data from the payment integration system 103. The coupon database 204 refers to a server and/or a database wherein the generated and/or received coupon data is stored. The generated and/or received coupon data may be provided to a customer via the payment integration system 103 in exchange for a mobile payment transaction such as through the customer's user device 104 as described herein. The customer may redeem the generated and/or received coupon data at the POS system 102 for goods and/or services that are associated with the coupon at a merchant once the customer's coupon data is verified by the verification system 205.

In one embodiment of the invention, the POS system 102 transmits a copy of this coupon data stored in database 204 to the coupon data storage database 322 in the vendor management system 316 of the payment integration system 103, and this transmittal of the copy of coupon data from POS system 102 to the vendor management system 316 makes the coupon data generated by the vendor available for purchase by customers. The coupon data may be in the form of an image, a string of code, letters, numbers, or combinations thereof. The coupon database 204 may be comprised of coupon data that has already been generated by the coupon code system 202, and/or the database 204 may serve as a repository of the coupon codes that have been earmarked for future generation by the payment integration system 103.

Thus, the present invention is distinguished from conventional POS systems by incorporating a first coupon database 204 having coupon data that has been preregistered on the vendor POS system 102 by any business entity that desires to offer one or more coupons to consumer users having a smart device with an app that incorporates the user components of the present invention and a second coupon database 322 of this same coupon data, as transmitted by the vendor to the payment integration system 103. The coupon data stored in the coupon database could be registered by individual retail suppliers of products or services or could be registered by manufacturers of products.

FIG. 2B illustrates the vender system 101 that is further comprised of the payment integration interface 206. In one embodiment, the payment integration interface 206 enables a vendor to associate the coupon data that is typically processed by the POS system 102 with the payment integration system 103. In an embodiment of the present invention, the payment integration interface 206 enables a vendor to upload coupon data to a data store on the payment integration system 103. As mentioned above, in one embodiment, the vendor system 101 may be integrated in the POS system 102. In another embodiment, the POS system, including the coupon code system 202, the coupon code database 204 and/or the verification system 205 may be embodied in the vendor system 101. The description above with regards to the coupon code system 202 and the coupon code database 204 is incorporated by reference herein.

In practice, the vendor system 101, via the payment integration interface 206, would typically upload coupon data to the payment integration system 103 for any number of coupons at a time, including, for example, thousands of coupons at a time, each such coupon being uniquely identified by, for example, a serial number. Because each coupon is uniquely identified, when a customer purchases one or more coupons, the present invention permits each successful coupon purchase to be reported back to the POS station 102 as further explained below, by generating a copy of the purchased coupon with its unique identification and transmitting this generated copy to the user device 104.

At the POS station 102, when a coupon is presented by a user on user device 104 for fulfillment of the purchased coupon, the coupon being presented is scanned into POS station 102. Because each coupon generated by the vendor for purchase by users is uniquely identified, verification system 205 on the POS station 102 can then decipher the scanned purchased coupon to determine which coupon in its coupon database 204 corresponds to the purchased coupon, Because the payment integration system 103 will generate a coupon to a user device 104 only upon successful completion of the user's payment, the coupon presented to the POS station 102 on user device 104 is inherently assured as having been purchased by user device 104. Moreover, the present invention permits a user to complete the payment transaction with his or her user device 104, which would not have been possible in a traditional system with a traditional POS system (without expensive and/or potentially disruptive hardware and software upgrades at the POS and vendor systems). In addition, the present system enables a customer to purchase and redeem coupons from multiple vendors that can be redeemed at several different locations—a feature that simply would not have been possible in the prior art because the various POS systems and vendor systems, in the prior art, had no available mechanism communicate with each other to maintain a joint and/or a universal coupon database that would prevent conflicting coupons from being issued to ensure appropriate payment was made available to each vendor and enabled a user to pay via his or her user device 104.

Each time the POS station 102 scans a coupon image from a user device 104 and processes this image data to decipher the identification of the presented coupon, the POS station 102 can then "mark off" that identified coupon from its coupon database 204 as having been sold. Similarly, once a coupon is purchased, the payment integration system 103 will "mark off" that identified coupon as sold and no longer available for sale.

In this manner, the present invention permits vendors having legacy POS stations 102 to accept coupon data from user devices 104—while, at the same time, permitting users to purchase the coupons on their mobile computing devices—without having to make expensive modifications or invest in newer POS equipment.

Figure 3:
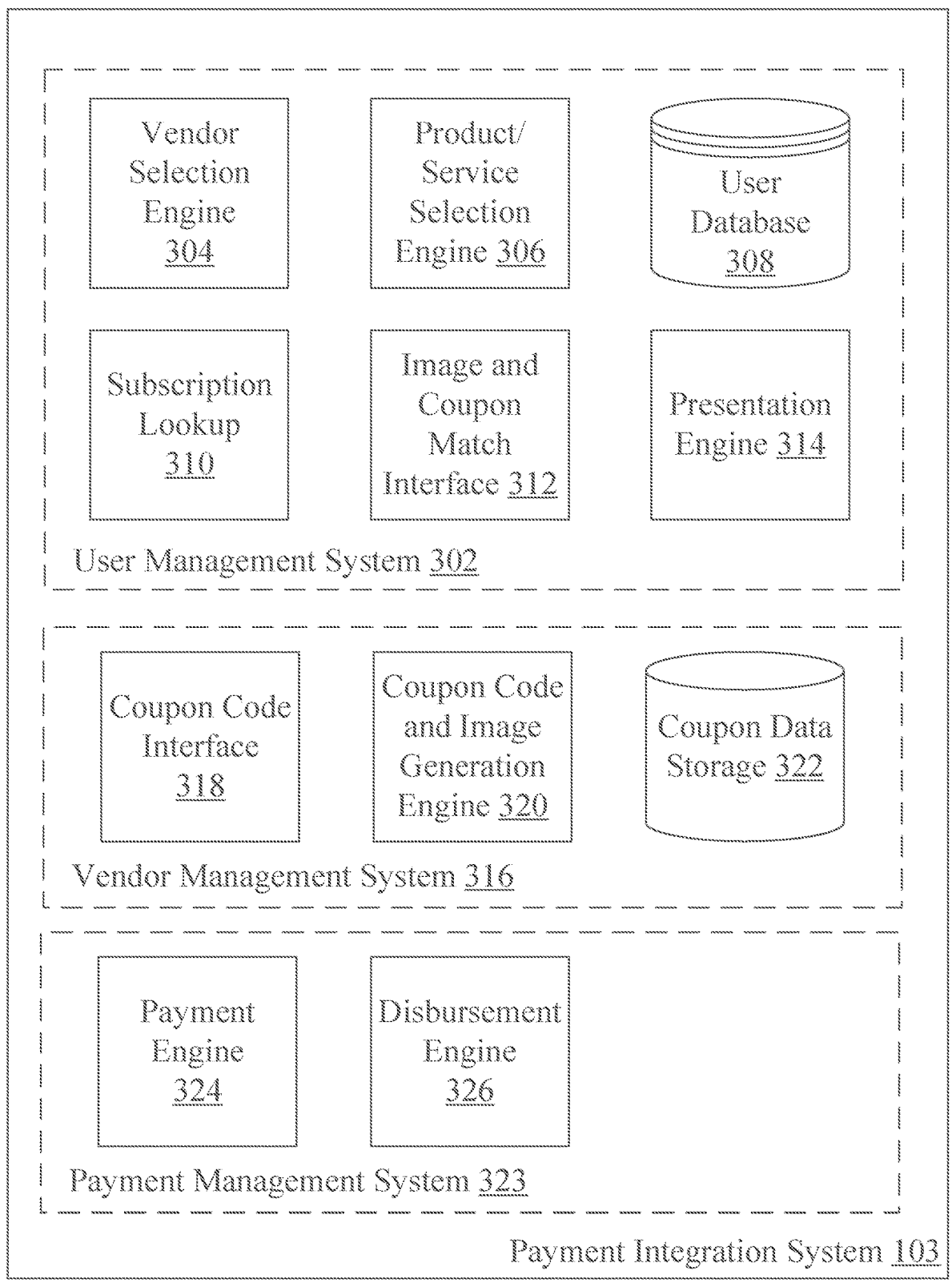
FIG. 3 is a block diagram illustrating an exemplary payment integration system, in accordance with the principles of the present invention.

Referring now to FIG. 2C, the various components on the user device 104 enable a user to provide his or her location to the payment integration system 103 (via the location interface 210), and provide/present a coupon (via the image processing interface 212) that is associated with the user's purchase to the vendor to complete a transaction. Specifically, the location interface 210 enables a user to provide his or her location via the location data on the user's device or via a user input. Alternatively, the user's location could be automatically electronically determined by, for example, an interface with Global Positioning System (GPS). The location data may be used by the payment integration system 103 to identify relevant vendors where a user may execute a purchase transaction, given the user's current location. The image processing interface 212 receives coupon image data from the image generation engine 320 of the vendor management system 316 and generates an image on the user's device, which can be presented to a vendor to complete a purchase transaction. As used herein, the term "image" is used for convenience only: the "image" may be a string of numbers and/or letters that may be input on the vendor's POS system 102 via an input device, or "image" may be represented by a bar code, including a matrix barcode (such as the well-known QR code or other similar systems) which can be scanned by the vendor's POS system 102. b Referring now to FIG. 3, a block diagram illustrates the various sub-components, sub-systems or modules of the payment integration system 103 of FIG. 1 in accordance with the principles of the present invention, including a user management system 302, a vendor management system 316, and a payment management system 323. The user management system 302 may be comprised of a vendor selection engine 304, a product/service selection engine 306, a user database 308, subscription lookup 310, image and coupon match interface 312, and presentation engine 314. The vendor management system 316 may be comprised of a coupon code interface 318, and a coupon code and image generation engine 320. The payment management system 323 may be comprised of a payment engine 324, and a disbursement engine 326.

The user management system 302 interfaces with a user's device to accept to provide coupons to one or more relevant vendors according to a number of different factors. The vendor selection engine 304 identifies one or more vendors wherein a user may present a coupon to complete a purchase transaction that is initiated on the user's device 104. As described in greater detail herein, the purchase transaction may be for a particular product or service offering with a particular vendor, or may be for a subscription. For example and without limitation, a user may purchase a subscription for a car wash, which may include a selection of a type of car wash that the user is eligible to receive in accordance to the purchase price paid.

Thus, another exemplary distinction of the present invention is the incorporation of a feature permitting consumers to purchase subscriptions for goods or services that are associated with coupon data that is preregistered in the coupon database. However, it should be clear to one of ordinary skill in the art that the coupons in the coupon database can be utilized by consumer users without being associated with any prearranged subscription.

In an embodiment of the present invention, the vendor selection engine 304 selects relevant vendors based on the user's geographic location. In another embodiment, the vendor selection engine 304 identifies one or more vendors based on vendors who are within the user's subscription package, if the user's current choice involves a subscription package. It is noted that the user may have preregistered a subscription package in the system, or the user's current interactions with the system might involve purchase of one of various subscription packages being offered by one or more vendors. The product/service selection engine 306 identifies one or more products and/or services that a user may qualify to receive based on his or her selection, or based on the user's chosen subscription package.

If a subscription is or has been purchased, then the subscription lookup 310 retrieves the user's subscription to help the vendor selection engine 304 and the product/service selection engine 306 identify relevant vendors and/or products/services that the user may be eligible with which to complete the transaction. The user database 308 stores user information as well as coupon data that is provided from vendors registering coupon being made available for purchase, and the image and coupon match interface 312 matches an image (that may be provided to a user for presentation to a vendor) with coupon data that is provided by the vendor. The generated image may be a string of one or more words, letters, numbers, symbols, or a combination thereof, which may be scanned or otherwise inputted into the vendor's POS system 102. The presentation engine 314 presents the image data to the user's mobile device 104.

Generated coupon images may originate from a second coupon database 322 in the vender management system 316 of the payment integration system 103 having coupon data for a many different possible intended coupons, as a copy of coupon data released by a vendor and as also stored in a first coupon database 204 in the vendor's POS station 102. This coupon data is presented to the image generation engine 320 of the payment integration system 103 upon successful completion of purchase of a coupon by the user device 104. Effectively, the present invention transforms the coupon data of the coupon database 322, based on selections by the user, into a specific coupon selected by the user's interactions with the app installed on user device 104.

Figure 4A:
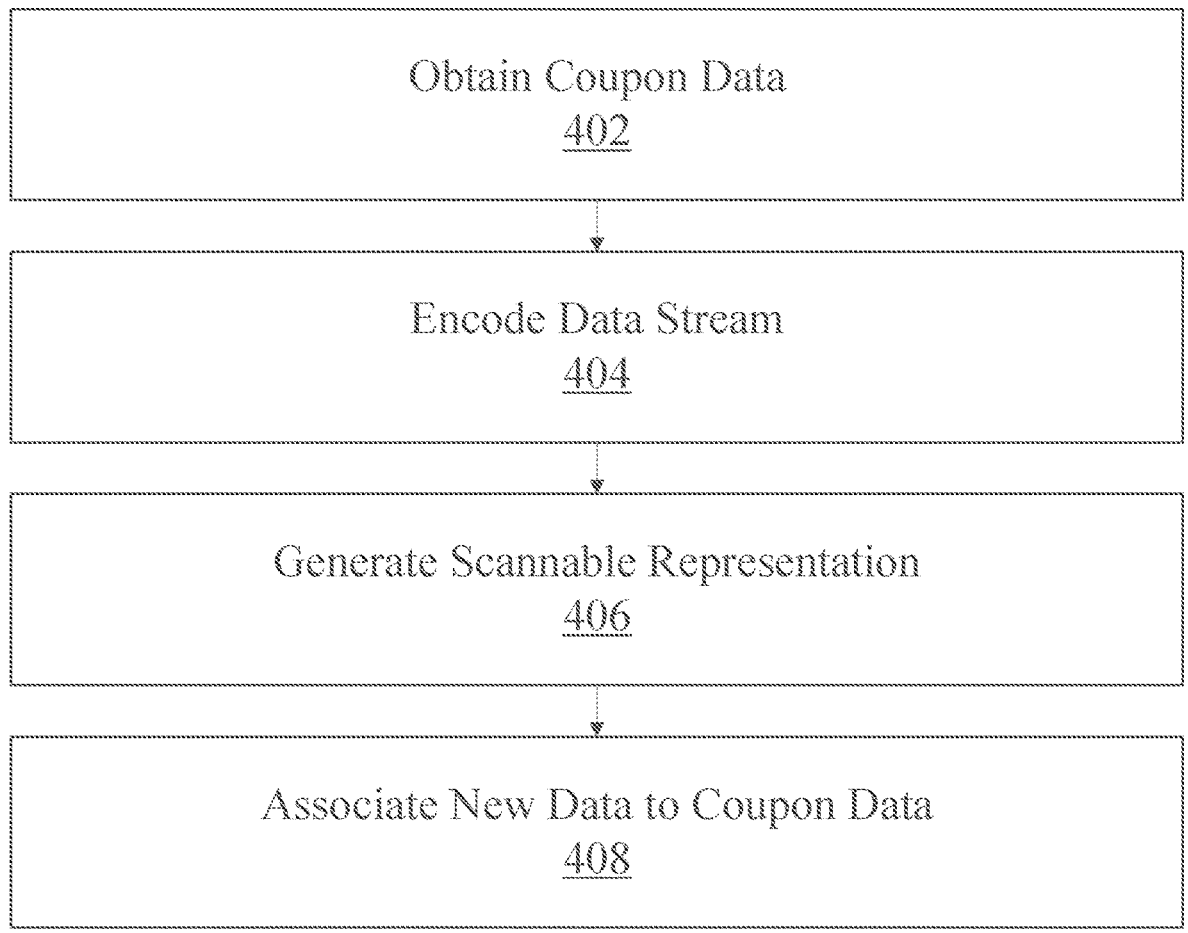
FIG. 4A is a process diagram illustrating an exemplary method for interfacing with a coupon system, in accordance with the principles of the present invention.

This transformation of coupon data into a coupon, as exemplarily demonstrated in FIG. 4A, can be done using various methods. For example, in a non-limiting exemplary embodiment, since each coupon registered by a vendor in the vender coupon database 322 includes a variety of information that uniquely describes an item, product, and/or service, or any combination thereof, this information stored in the coupon database 322 in the format of 1's and 0's can be supplied as input data, for example, into an encoding engine 320 that generates a matrix barcode that serves as indicia on the coupon that would be presented on the user device 104 to uniquely identify one of the possible coupons preregistered in the coupon database 322. For example, the barcode CODE 39 generator and/or matrix barcode QR code generator are well known in the art and readily available to make barcodes that could be used in the coupon code and generation engine 320 to provide a coupon image generated for display on user device 104.

Thus, as exemplarily shown in FIG. 4A, in step 402, the vendor management system 316 retrieves coupon data from its data storage 322 and, in step 404, encodes this data for presentation as input data into a Code 39 or QR code generator to generate, in step 406, a scannable image such as a bar or matrix barcode. In step 408, additional data such as text characters or other indicia that describe the object of the coupon and the retailer's name, is added to the coupon as transmitted to the user device 104, An additional item that might be added is a serial number, permitting each issued coupon to be identified and tracked individually. This feature of being able to track individual coupons provides the additional benefit of permitting the vendor to track which serial numbers have been presented, thereby precluding the possibility that a coupon is presented multiple times. This serial number or other mechanism to identify each coupon individually could be part of the coupon data as presented by the vendor when the vendor adds coupon data to the vendor database 322. Alternatively, the coupon code and generation engine 320 could add identification number information when a coupon is generated.

The vendor management system 316 interfaces with the vendor system 101 to obtain coupon data from the vendor and generates an image that may be scanned or otherwise input into the vendor's POS system to complete a purchase transaction. The coupon code interface 318 interfaces with the user management system 302 to provide coupon data to the user management system 302. The coupon code and image generation engine generates an image to enable a POS system 102 to recognize the image. If the image includes a bar or matrix barcode, the POS system 102 could include, if appropriate, a decoder to decode the bar or matrix barcode that was produced by the transformation of the coupon data by the encoder so that the vendor would be able to decipher the bar or matrix barcode should it be appropriate for the vendor or retailer to decipher a barcode to complete the transaction.

As previously mentioned, the vendor's existing POS station 102 could include a smart terminal into which an app including features of the present invention can be easily downloaded and incorporated into this vendor's existing POS station 102, in order to permit the POS station 102 to communicate with the payment integration system 103 of the present invention. In this first exemplary embodiment, the vendor's existing POS station 102 can be easily and cheaply configured to incorporate appropriate interface components of the present invention.

In another possible exemplary embodiment, the vendor could send coupon data to be incorporated into coupon code database 320 of the payment integration system 103 using another transmission channel such as via an API integration, email transmission, etc.

Thus, in either the first exemplary embodiment in which the vendor's existing POS station can download an app with the present invention components or the second exemplary embodiment in which the vendor's existing POS station cannot download such app but uses instead an associated independent smart device, the vendor's existing POS station can be easily and inexpensively configured to incorporate features of the present invention.

The payment management system 323 interfaces with a payment gateway and disburses funds to the vendor in accordance with certain criteria, which may be varied. The payment engine 324 obtains payment method data and initiates a payment transaction, which may subsequently be settled with an appropriate banking system. The disbursement engine 326 disburses funds to the vendor in accordance with preset terms, customer usage, and a disbursement schedule.

Figure 4B:
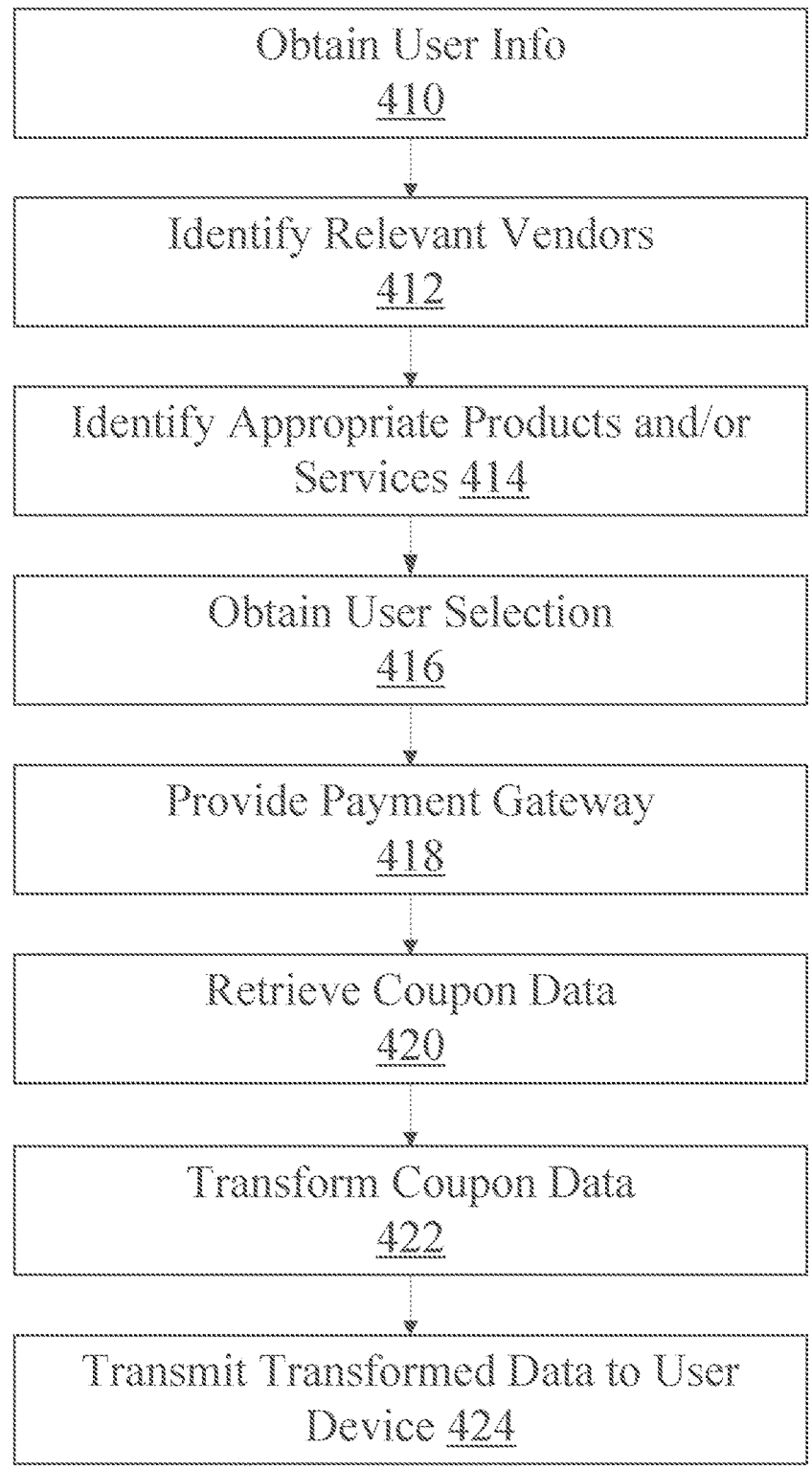
FIG. 4B is a process diagram illustrating an exemplary method for initiating a transaction, in accordance with the principles of the present invention.
Figure 4C:
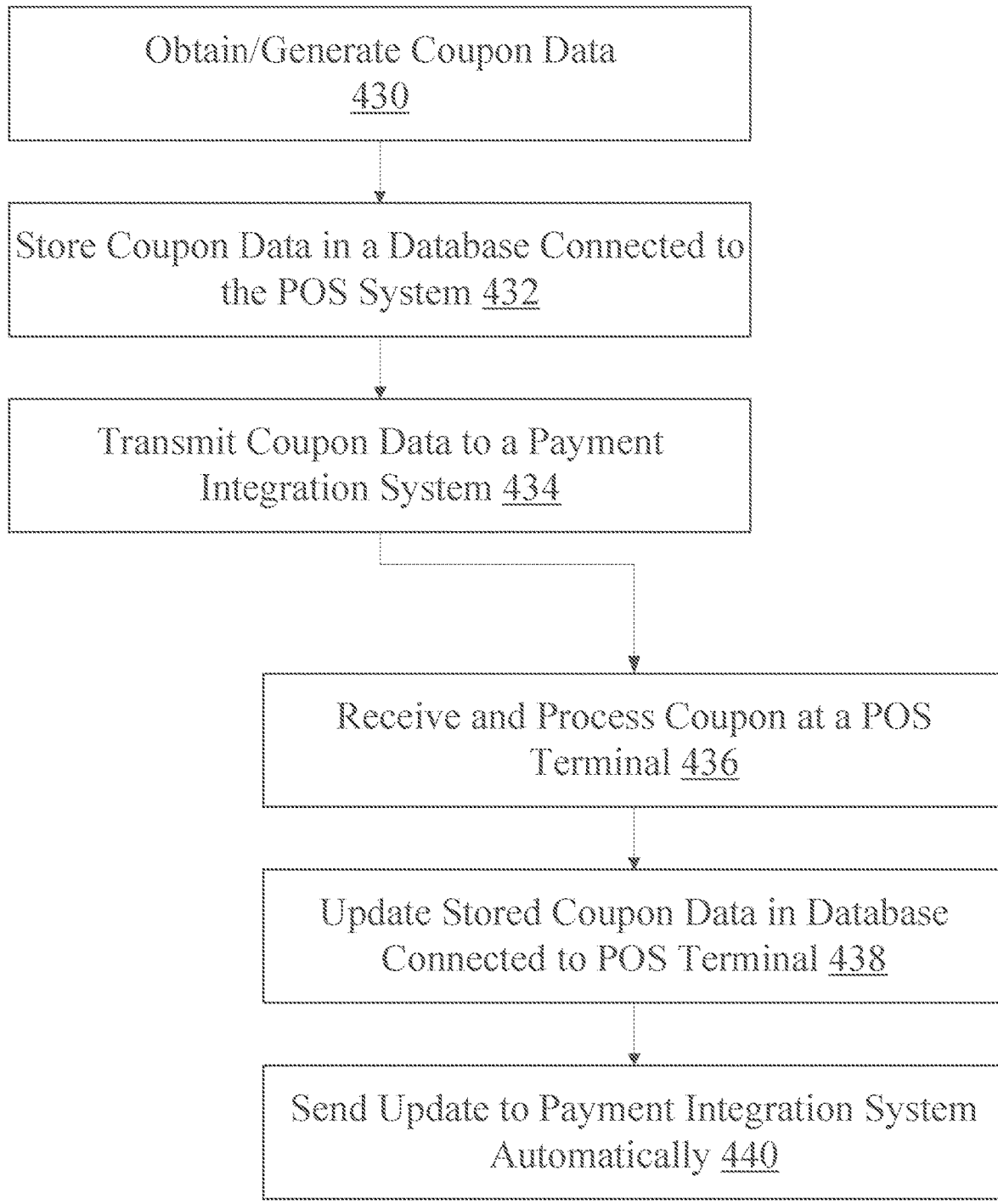
FIG. 4C is a process diagram illustrating a method for redeeming coupons at a POS terminal, in accordance with the principles of the present invention.

Referring now to FIGS. 4A, 4B, and 4C, process diagrams illustrate exemplary methods for interfacing with a coupon system and initiating a transaction for enabling payment methods in accordance with the principles of the present invention. Specifically, FIGS. 4A, 4B, and 4C illustrate exemplary processes for enabling the system described herein.

Generally, as illustrated in FIG. 4A and previously discussed above, for generating a coupon to transmit to a user device 104, the process obtains coupon data in step 402 from the database associated with the vendor management system 316. The coupon data in the vendor management system database was previously sent by one or more vendors who wish to have their coupon data available for use by the public. The coupon is generated in steps 404 through 408 and transmitted to the user device 104.

As illustrated in FIG. 4B, the process obtains user info in step 410 by, for example and without limitation, receiving selections made by a user as the user exercises an app on user device 104 to make a purchase transaction. As part of the purchase transaction, the user management system might use data in the subscription lookup module 310, for checking whether a user is subscribed for a package of products or service and/or whether the user has prepaid for a product for those exemplary embodiments that incorporate subscription features. As the purchase transaction selections proceed, in step 412 the user may invoke the payment interface 214 on the user device 104 to access a payment gateway to permit the user to make a payment, if necessary if, for example, the user has not already paid for a subscription or the user wishes to make a payment outside a subscription. Invocation of a payment gateway may exemplarily involve, for example, a payment processing system 106 to interface with an electronic banking system 108 to permit the user to conduct a banking transaction. For purpose of the present invention, details of this payment processing are considered well known in the art, since the user device 104 is assumed to have capability to interface with one or more payment processing systems.

However, the present invention may exemplarily provide information and receive information during payment processing, using payment integration interface 206 of the vendor system 101, the payment engine 324 and disbursement engine 326 of the payment integration system 103, which permits the present invention to receive, in step 414, a confirmation that payment has been successfully completed for the present desired transaction, as well as information, in step 416, on payment amount and the purchased product(s) and/or service(s).

User management system 302 will use the subscription lookup module 310 to check user database 308 whether a subscription is involved in the present transaction and, if so then the process identifies, in step 418, relevant vendors who may fall within or sell products or services that the user has subscribed to, and/or vendors who sell products/services that the user has prepaid for, and/or vendors that are relevant to the user based on other user selections and/or geographic location, using vendor selection engine 304, product/service selection engine 306 of the user management system 302.

Thereafter, in step 420 the process identifies appropriate products and/or services that fall within the user's subscription and/or prepaid purchase. The identified vendor and product/service information is provided to the user, using presentation engine 314 and image and coupon match interface 312. A user selection, typically confirming a purchase, is obtained in step 422, using, for example, a pull-down menu on the app of the user device 104, and coupon data relative to the user's selection is retrieved from coupon data storage 322, using coupon code interface 318. The process thereafter, in step 424, transforms the relevant coupon data to generate a coupon, using coupon code and image generation engine 320 and presentation engine 314, to provide a consumable representation of coupon data to the user's computing device 104, which when presented to the vendor represents the end or the completion of the purchase transaction. Note, in some instances, if a user has not signed up for a subscription—then the process may request a user selection for a subscription purchase. Note, also, for ease of description a payment processing step is not illustrated in FIGS. 4A and 4B; however, the payment step may be introduced at a variety of different steps within the process if a user wishes to purchase a subscription or a product/service offering. In an embodiment of the present invention, the payment step may be presented to the user in step 412.

FIG. 4C exemplarily shows actions in the POS system 102 in accordance with the present invention. In step 430, in accordance with an embodiment, the POS system 102 and/or the vendor system 101 obtains coupon data 320 from a list of pre-generated coupon dataset. In another embodiment, at step 430, the POS system 102 and/or the vender system 101 may generate coupon data. A step 432 the obtained/generated coupon data is stored in a coupon database that is connected to the POS system 102. The database may be, for example, an on-premises server that is traditionally used to transact coupon/pre-payment type of redemption transactions. A step 434, the coupon data is transmitted to a payment integration system 434. As described above in reference to FIG. 4A, the payment integration system may receive the coupon data and manipulate it further to generate a digital representation embodying the coupon data that may be sent to a user's computing device.

If a user presents a coupon at a point-of-sale terminal at a brick-and-mortar location, then, at step 436, the digital representation of the coupon is received and processed at the point of sale terminal. If the coupon is redeemed, at step 438, the coupon data is updated or otherwise "checked-off" as having been used/redeemed in the database that is connected to the POS terminal. Thereafter, at step 440, the updated data is send to the payment integration system automatically such that the payment integration's database is also updated to reflect that a coupon has been used/redeemed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device, including computing devices incorporated into or associated with vehicles), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
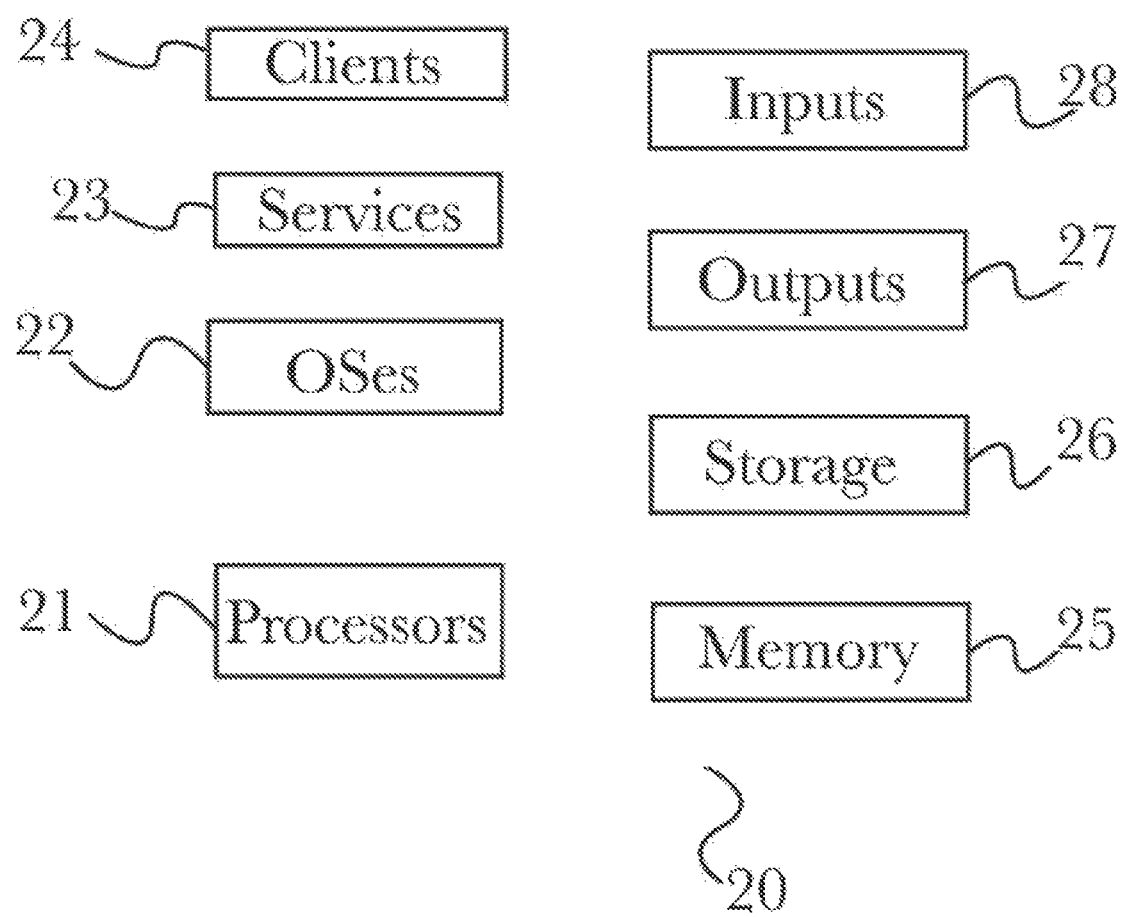
FIG. 6 is a block diagram illustrating an exemplary logical architecture for a client device, in accordance with the principles of the present invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
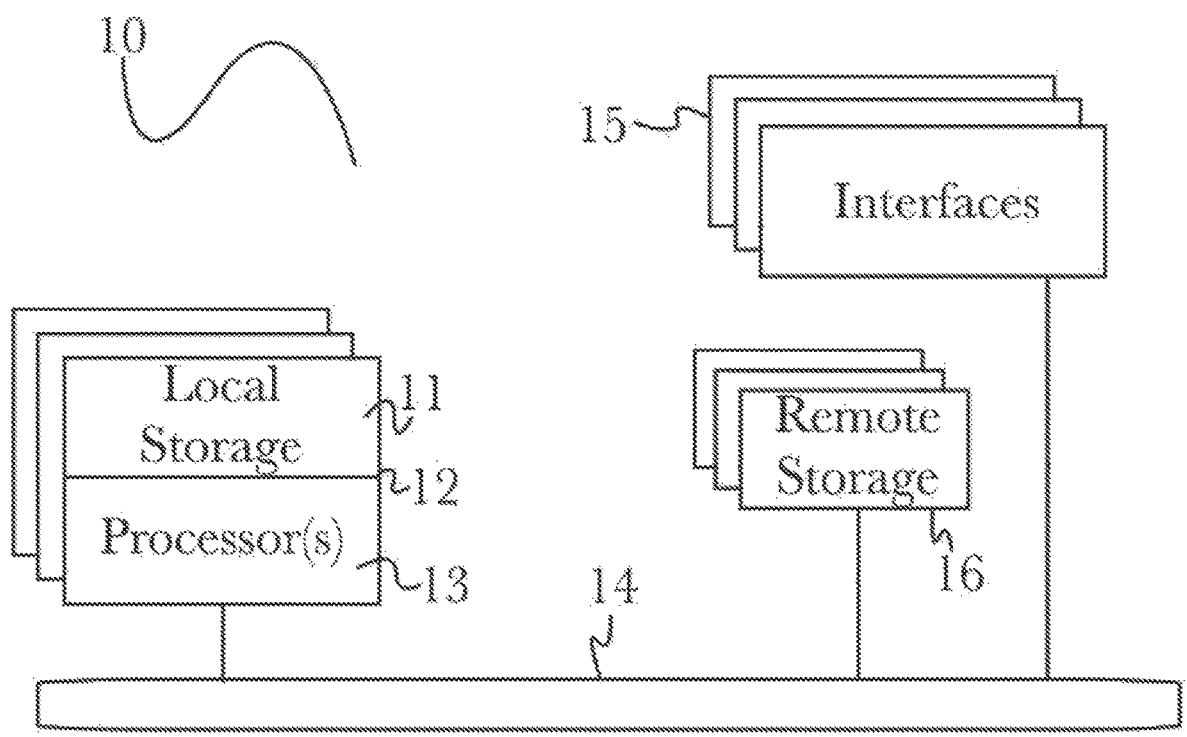
FIG. 5 is a block diagram illustrating exemplary hardware architecture of a computing device, in accordance with the principles of the present invention.

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
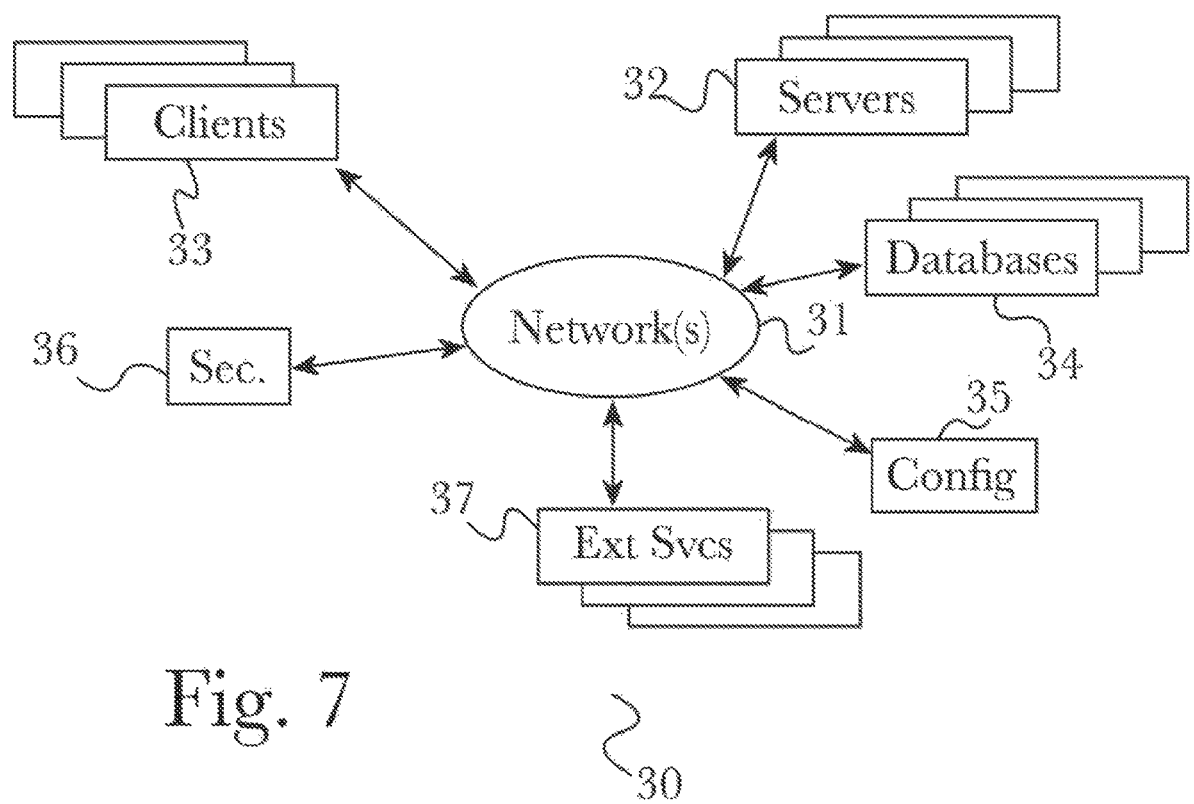
FIG. 7 is a block diagram showing an exemplary architectural arrangement of clients, servers, and external services, in accordance with the principles of the present invention.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
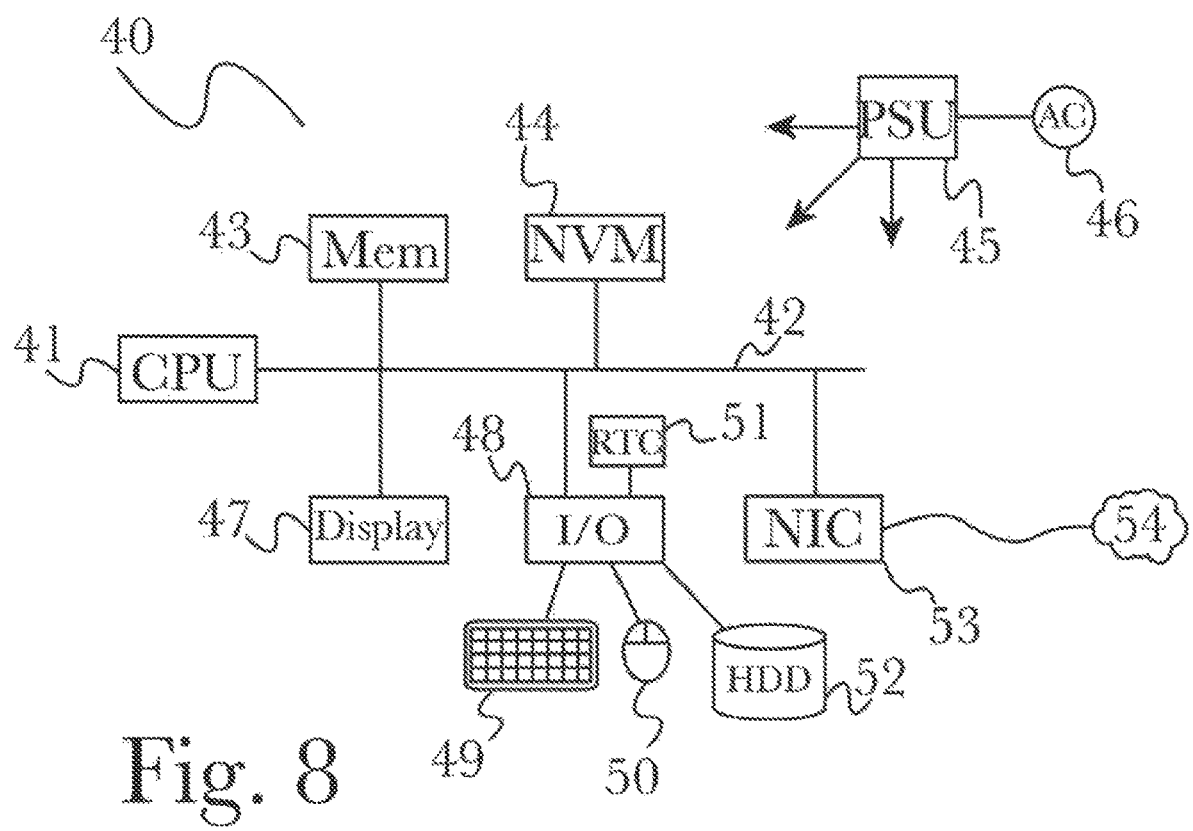
FIG. 8 is another block diagram illustrating an exemplary hardware architecture of a computing device, in accordance with the principles of the present invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

The terms "about" or "approximately" or the like, when used with a number, may mean that specific number, or alternatively, a range in proximity to the specific number, as understood by persons of skill in the art field (for example, +/−10%).

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product comprising a non-transitory computer readable storage medium having instructions encoded thereon that, when executed by a processor, cause the processor to:

obtain user information from a user device as related to a user's desired purchase transaction;

identify brick-and-mortar retail vendors that are relevant to the user's desired purchase transaction and present the relevant vendors to the user's user device;

based on the user's purchase transaction selections using the user device, identify appropriate product and/or service options available for selection by the user;

receive an indication of which vendor and which product and/or service the user selects;

provide a payment gateway for the user to execute a payment using the user's user device for the selected product and/or service;

obtain a confirmation of receipt of payment from one of the user's user device and the payment gateway;

based on the user's selections, obtain data for a coupon issued by a vendor providing the selected product and/or service and indicated as having a status of "unused";

transform the coupon data to generate a coupon in a display format for presentation to the vendor; and transmit the coupon to the user device for presentation by the user to the vendor, so that the user can claim the selected product and/or service from the vendor, wherein a payment integration coupon database stores coupon data previously supplied from a plurality of different vendors wishing to provide items and/or services using coupons that are used to confirm payment, wherein:

upon successfully completing the payment for the item and/or service being purchased, an external payment processing system transmits an indication of a successful payment to a payment integration system via the payment gateway to a banking system and the payment integration system, and upon receiving the indication of successful payment, the payment integration system generates an image of a coupon for the item and/or service being purchased and transmits the generated coupon image to the user's user device, and wherein the coupon is generated in the display format by:

connecting to a vendor coupon database to obtain coupon data for the item and/or service being purchased; and generating the coupon to be transmitted to the user device using the coupon data obtained from the vendor coupon database.

2. The computer program product of claim 1, wherein the redemption of the coupon on the user device inherently advises the vendor that the payment for the selected product and/or service has been successfully completed by the user once the vendor confirms that the coupon being displayed is determined to be a coupon validly issued by the vendor that has not been previously redeemed.

3. The computer program product of claim 2, further wherein a status of the coupon presented to the vendor and determined to be validly issued and not previously presented is changed from the status of "unused" to the status of "used".

4. The computer program product of claim 1, further wherein a point-of-sale (POS) station of the vendor may or may not be able to perform the transaction that the user has executed on his or her user device.

5. The computer program product of claim 1, wherein the user information is further comprised of user location information indicating a current location that is associated with the user device.

6. The computer program product of claim 1, further wherein the payment is made via a method from the group consisting of mobile wallets, credit cards, points, and combinations thereof.

7. The computer program product of claim 1, wherein the encoded instructions further cause the processor to automatically adjust the payment gateway in accordance with information provided by the user device.

8. The computer program product of claim 1, further wherein the coupon data is selected from the group consisting of an image, text, a string of code, letters, numbers, or combinations thereof.

9. The computer program product of claim 1, as comprising a non-transitory, computer readable storage device on a computer selectively connected to a network that permits the computer to be selectively connectable to one or more vendor point-of-sale (POS) stations that lack a capability to determine whether a payment has been successfully completed for a good and/or service selected by a user device but has a capability to scan the coupon presented on the user device, analyze the scanned coupon, and determine whether the coupon presented is an unused coupon validly issued by the vendor.

10. An electronic payment system based on using electronic coupons for executing transactions between a user device and a point-of-sale terminal at a brick-and-mortar retail location, the electronic payment system comprising:
a vendor system, as implemented by a processor on a computer, the vendor system selectively connectable via a network to one or more external vendor point-of-sale (POS) systems at brick-and-mortar retail locations, each external vendor POS system associated with a vendor offering at least one item or service for purchase by customers, the vendor POS system including a vendor POS coupon database storing coupon data defining one or more coupons issued by that vendor, each coupon defining at least one of an item and a service available from the vendor for purchase;
a payment integration system for interfacing via a network connection with an external payment processing system that electronically and separately processes payments being executed by users using user devices to make purchases from vendors, the payment integration system selectively providing a gateway on the network connection to a banking system that enables a user with a user device to complete an electronic payment via the user device, to purchase an item and/or service from a vendor; and
a payment integration coupon database storing coupon data previously supplied from a plurality of different vendors wishing to provide items and/or services using coupons that are used to confirm payment,
wherein the vendor providing the item and/or service being purchased by the user uses the coupon data stored in the vendor POS coupon database as a means to verify that a payment for the item and/or service being purchased has been successfully completed,
wherein:
upon successfully completing the electronic payment for the item and/or service being purchased, the external payment processing system transmits an indication of successful payment to the payment integration system via the gateway to the banking system and the payment integration system, and
upon receiving the indication of successful payment, the payment integration system generates an image of a coupon for the item and/or service being purchased and transmits the generated coupon image to the user's user device, and
wherein the payment integration system generates the image of the coupon by:
connecting to a vendor coupon database to obtain coupon data for the item and/or service being purchased; and
generating the coupon to be transmitted to the user device using the coupon data obtained from the vendor coupon database.

11. The electronic payment system of claim 10, wherein the user claims the purchased item and/or service from the vendor by presenting the coupon image on a display of the user's user device to the vendor so that the vendor can verify payment has been made by confirming that the presented coupon image comprises a coupon issued by the vendor and/or the payment integration system that has not yet been used, by comparing coupon data from the presented coupon image with coupon data stored in the vendor's POS system.

12. The electronic payment system of claim 11, wherein the confirming that the coupon image on the user's user device comprises an unused coupon issued by the vendor comprises:
scanning the coupon image presented on the user device into a vendor POS station;
processing, on a vendor POS system processor, data of the scanned coupon image; and
searching the vendor POS coupon database in the vendor POS system to confirm that data of the scanned coupon image matches that of a coupon previously defined by the vendor's POS system and that the previously-defined coupon that matches the scanned coupon image is indicated in the vendor POS coupon database as being an "unused" coupon.

13. The electronic payment system of claim 12, wherein, when the scanned coupon image matches an unused, previously-defined coupon, a status of the matched unused previously defined coupon is changed from "unused" to "used".

14. The electronic payment system of claim 10, wherein the payment integration system generates the image of the coupon by:
connecting to a vendor POS system of the vendor offering the item and/or service being purchased;

obtaining coupon data for the item and/or service being purchased from the vendor POS coupon database; and
generating the coupon to be transmitted to the user device.

15. The electronic payment system of claim 10, wherein the payment integration system interfacing with an external payment processing system selectively provides a gateway to a selected banking system from a plurality of banking systems, the payment integration system selecting the banking system based on information received from the user device.

16. The electronic payment system of claim 10, wherein one or more coupons issued by a vendor are associated with a subscription with the vendor, subscription defining that a user is entitled to purchase a predefined number of a given item and/or service within a predefined length of time.

17. A method, as implemented by a processor on a computer selectively connectable to a network, using machine-readable instructions stored in a non-transitory memory device accessible by the processor, the method comprising:
   receiving information from a user device as related to a purchase transaction desired by a user;
   identifying brick-and-mortar retail vendors relevant to the desired purchase transaction and present the relevant venders to the user device;
   based on the purchase transaction selections obtained from the user device, identifying appropriate product and/or service options available for selection by the user;
   receiving an indication of which vendor and which product and/or service the user selects;
   providing a payment gateway for the user to execute a payment using the user device for the selected product and/or service;
   receiving a confirmation of receipt of payment from one of the user's user device and the payment gateway;
   based on the user selections, obtaining data for a coupon issued by a vendor providing the selected product and/or service and indicated as having a status of "unused";
   transforming the coupon data to generate a coupon in a display format for presentation to the vendor; and
   transmitting the coupon to the user device for presentation by the user to the vendor, so that the user can claim the selected product and/or service from the vendor,
      wherein a payment integration coupon database stores coupon data previously supplied from a plurality of different vendors wishing to provide items and/or services using coupons that are used to confirm payment
   wherein:
      upon successfully completing the payment for the item and/or service being purchased, an external payment processing system transmits an indication of successful payment to a payment integration system via the payment gateway to a banking system and the payment integration system, and
   upon receiving the indication of successful payment, the payment integration system generates an image of a coupon for the item and/or service being purchased and transmits the generated coupon image to the user's user device, and
   wherein the coupon in the display format is generated by:
      connecting to a vendor coupon database to obtain coupon data for the item and/or service being purchased; and
      generating the coupon to be transmitted to the user device using the coupon data obtained from the vendor coupon database.

18. The method of claim 17, wherein the display of the coupon on the user device inherently advises the vendor that the payment for the selected product and/or service has been successfully completed by the user once the vendor confirms that the coupon being displayed is determined to be a coupon validly issued by the vendor that has not been previously presented.

* * * * *